(12) United States Patent
Hsin

(10) Patent No.: US 6,176,358 B1
(45) Date of Patent: Jan. 23, 2001

(54) CABLE REWINDING DEVICE WITH DETECTOR

(76) Inventor: Liao Sheng Hsin, No. 137, San Chun St., Shu Lin Jen, Taipei Hsien (TW)

(*) Notice: Under 35 U.S.C. 154(b), the term of this patent shall be extended for 0 days.

(21) Appl. No.: 09/339,845

(22) Filed: Jun. 25, 1999

(51) Int. Cl.⁷ .................................................. H02G 11/00
(52) U.S. Cl. .................................. 191/12.2 R; 191/12.4; 324/556
(58) Field of Search ........................... 191/12 R, 12.2 R, 191/12.4, 12.2 A; 324/556

(56) References Cited

U.S. PATENT DOCUMENTS

| | | | |
|---|---|---|---|
| 4,779,052 | * 10/1988 | Levy et al. | 324/556 |
| 5,718,310 | * 2/1998 | Gallo | 191/12.2 R |
| 5,819,893 | * 10/1998 | Wagner et al. | 191/12.4 |

\* cited by examiner

Primary Examiner—Mark T. Le
(74) Attorney, Agent, or Firm—Rosenberg, Klein & Lee (57) ABSTRACT

A cable rewinding device comprises a rewinding box, a detector provided on a side of the rewinding box received in the rewinding box in a universal joint manner in a stored position having a ball member, a body including a detecting circuit having a circuit board, a plurality of lights, and a plurality of cords, and a head portion extended outwardly from the body having first spaced grooves and second spaced grooves, in which the cords are in an electrical communication with the first and the second spaced grooves such that an electrical status such as open circuit, error in connection, or over current of a cable having a plug is obtained through the lights when the plug is inserted into the first and the second spaced grooves. With this device, repairing in time, preventing error in connection, and avoiding damage to the electrical equipment are realized.

13 Claims, 10 Drawing Sheets

CABLE REWINDING DEVICE WITH DETECTOR

BACKGROUND OF THE INVENTION

1. Field of the Invention

The present invention relates to a cable rewinding device, and more particularly to a cable rewinding device with detector for detecting the communication cable and showing its electrical status.

2. Description of Related Art

Communication cables are widely employed in the electrical communication between electrical devices, such as computers, modems, telephones, and facsimile machines. Typically, a cable rewinding box is used to pulling and winding cable in an ordered way for dealing with the lengthy mixed cable.

A number of cable rewinding devices have been located in a search, such as Taiwanese Utility Model Patent Application Numbers 87,214,430, 87,215,276, and 88,203,935. These three prior art devices generally comprises a housing, a take-up reel provided on the base of the housing for winding the cable, and a helical spring acting as retaining or loosening the cable. Further, various cable connection configurations and take-up reel constructions have been proposed in these prior art.

However, they only provide the functions of communication and taking up reel at most. Other functions, such as detecting the communication cable, determining whether the communication cable is open or closed, or incorrectly connected, or measuring the current in the cable for determining whether it is over a predetermined threshold (note the threshold may be different in different countries) in order to pre-warning the consumers and communication equipment manufacturers if such occur, are totally not provided. As such, a poor communication and even a failure may occur.

A need remains to provide an improved cable rewinding device to overcome the above drawbacks of prior art.

SUMMARY OF THE INVENTION

It is an object of the present invention to provide a cable rewinding device with detector for achieving the purposes of pulling and winding cable in an ordered way as well as of detecting the communication cable and showing its electrical status.

The advantages of the present invention are realized by providing a detector with at least one lights on a side of the cable rewinding device. The detector has a detecting circuit to detect the cable status by attaching to a jack, thereby showing a detected result by turning on or turning off the lights. By utilizing this device, additional functions such as determining whether the communication cable is open or closed, or incorrectly connected, or measuring the overcurrent in the cable are possible to carry out, resulting in offering various advantages such as repairing the failed communication devices in time, preventing error in connection, and avoiding damage to the electrical equipment.

The above and other objects, features and advantages of the present invention will become apparent from the following detailed description taken with the accompanying drawings.

DETAILED DESCRIPTION OF THE PREFERRED EMBODIMENTS

Figure 1:
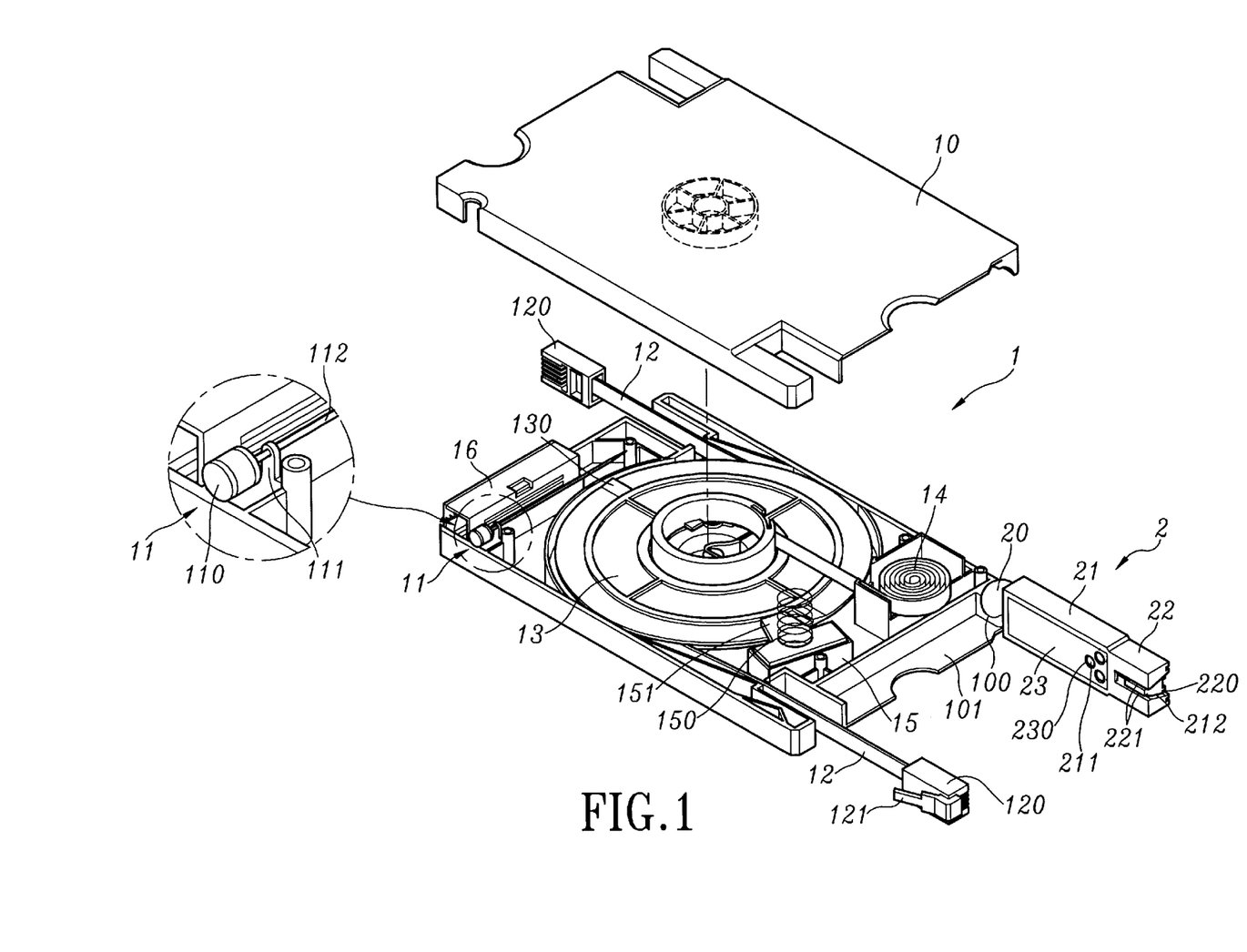
FIG. 1 is a perspective view of a cable rewinding device having a detector of a first embodiment of the present invention with the cover of the housing separated.
Figure 2:
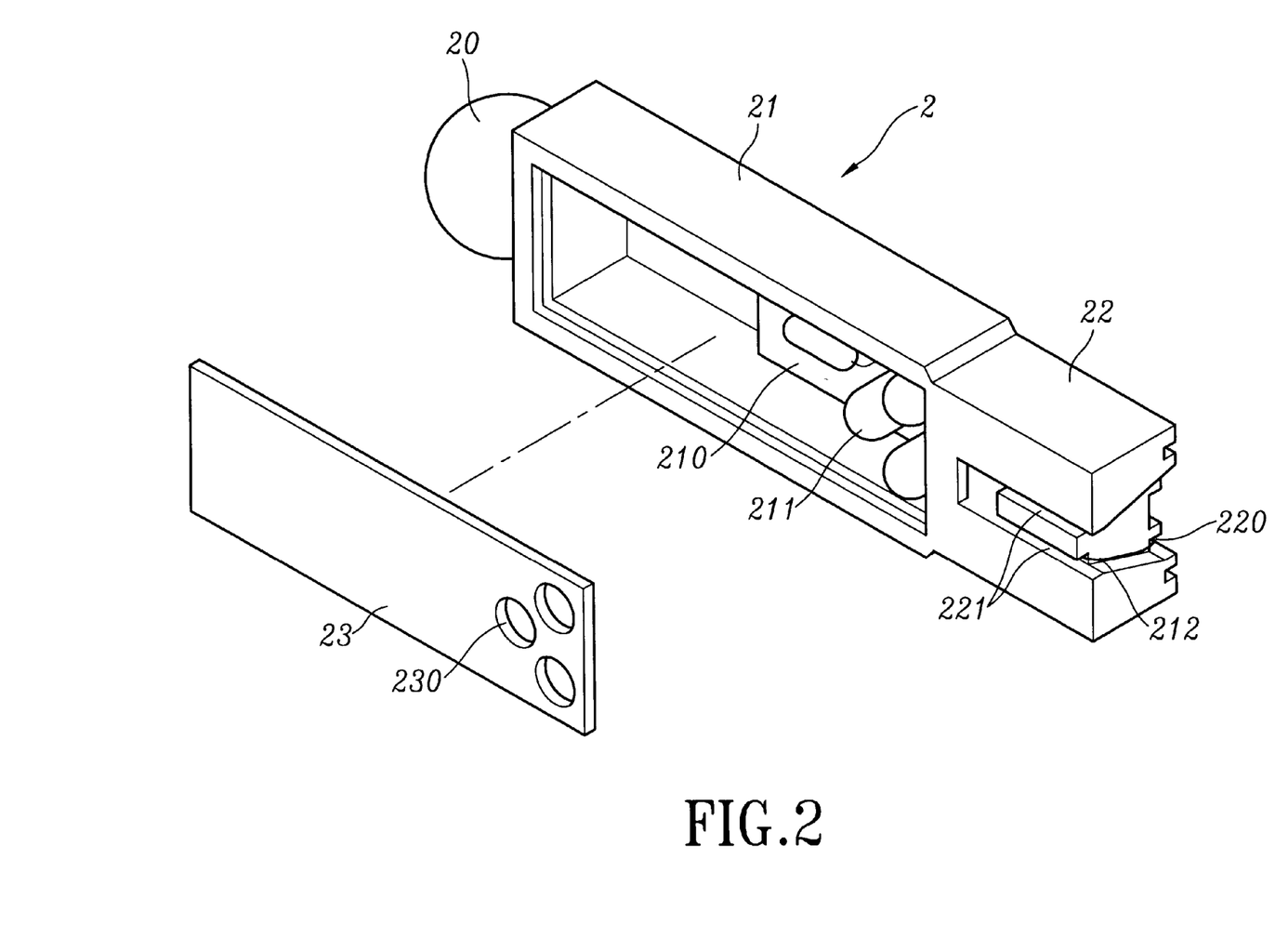
FIG. 2 is a perspective view of the detector of FIG. 1 with the cover of the detector seperated.
Figure 3:
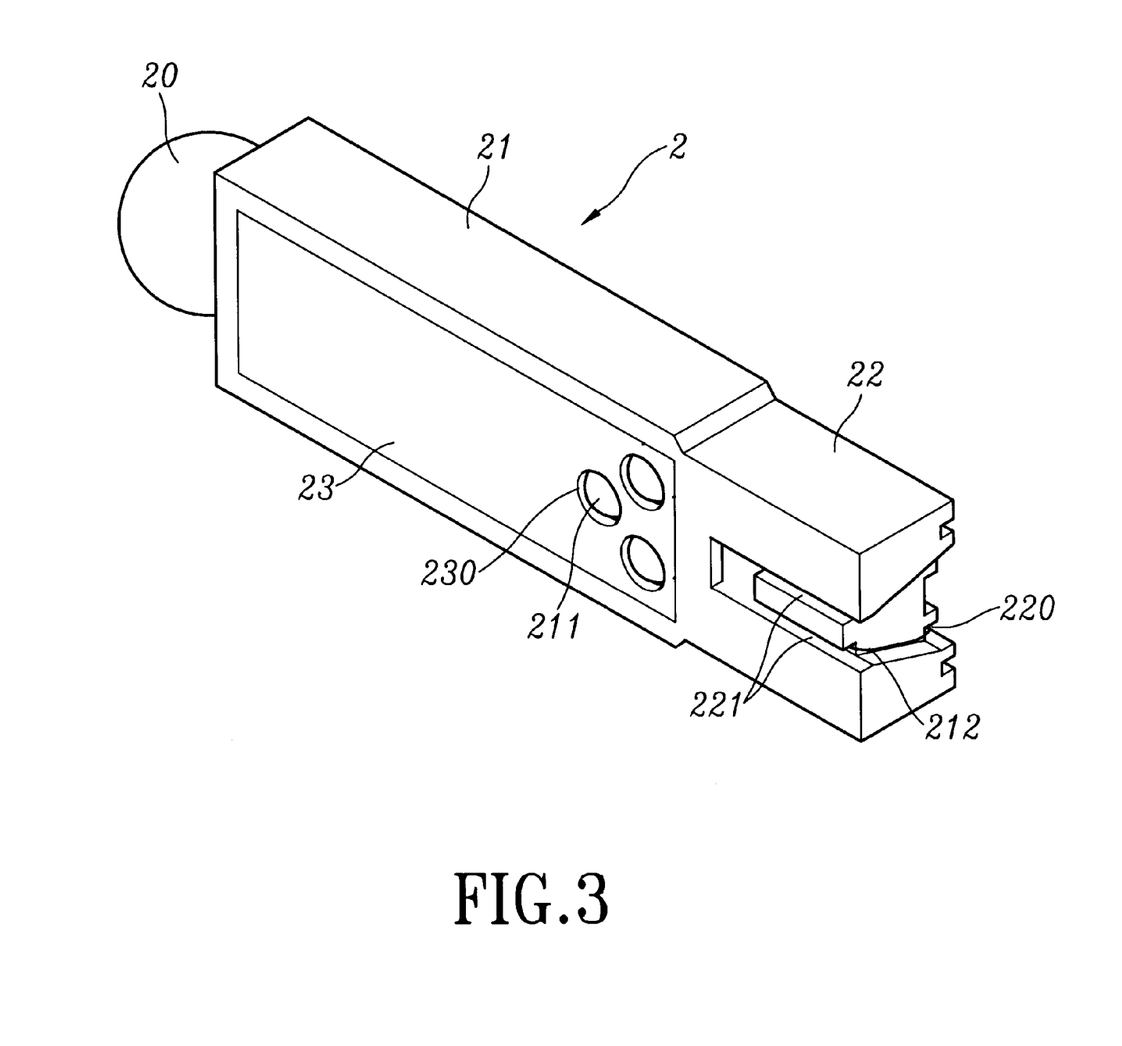
FIG. 3 is a perspective view of FIG. 2.
Figure 4:
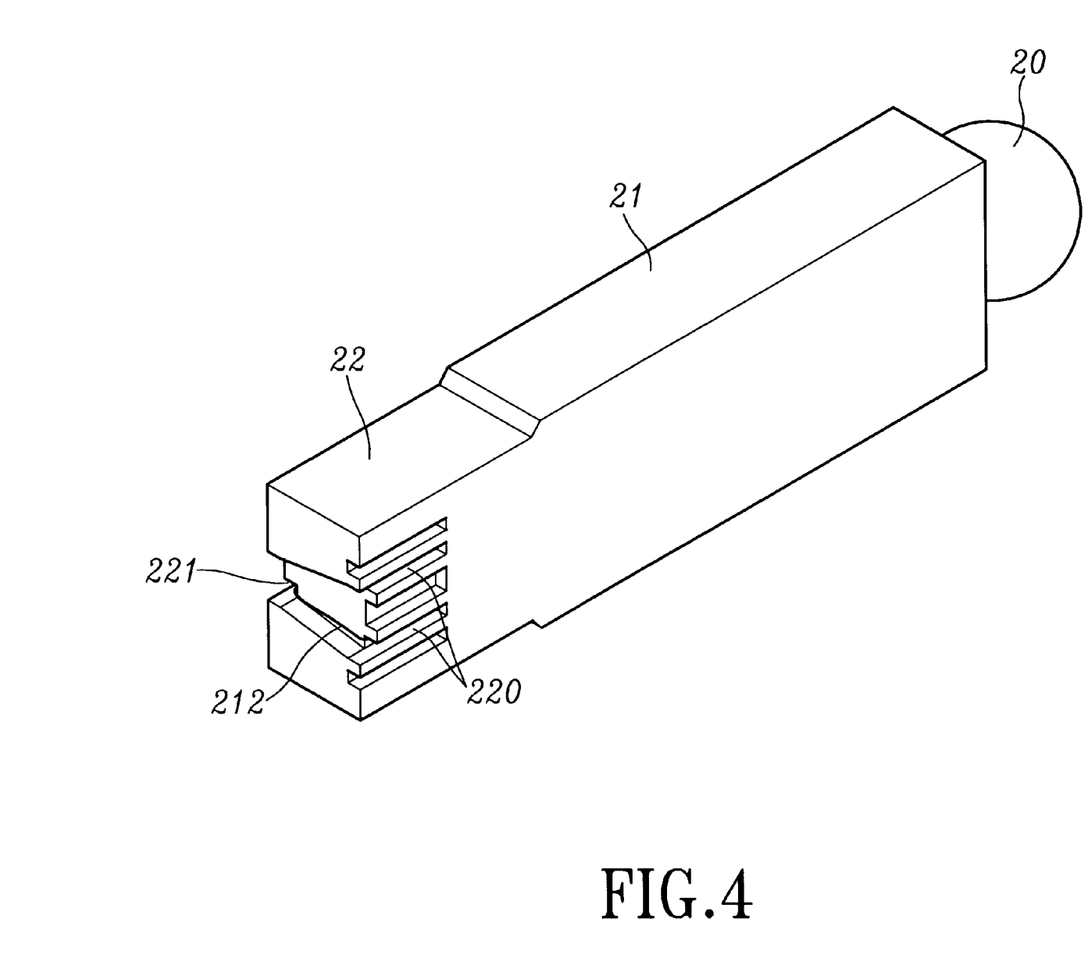
FIG. 4 is another perspective view of FIG. 2.
Figure 5:
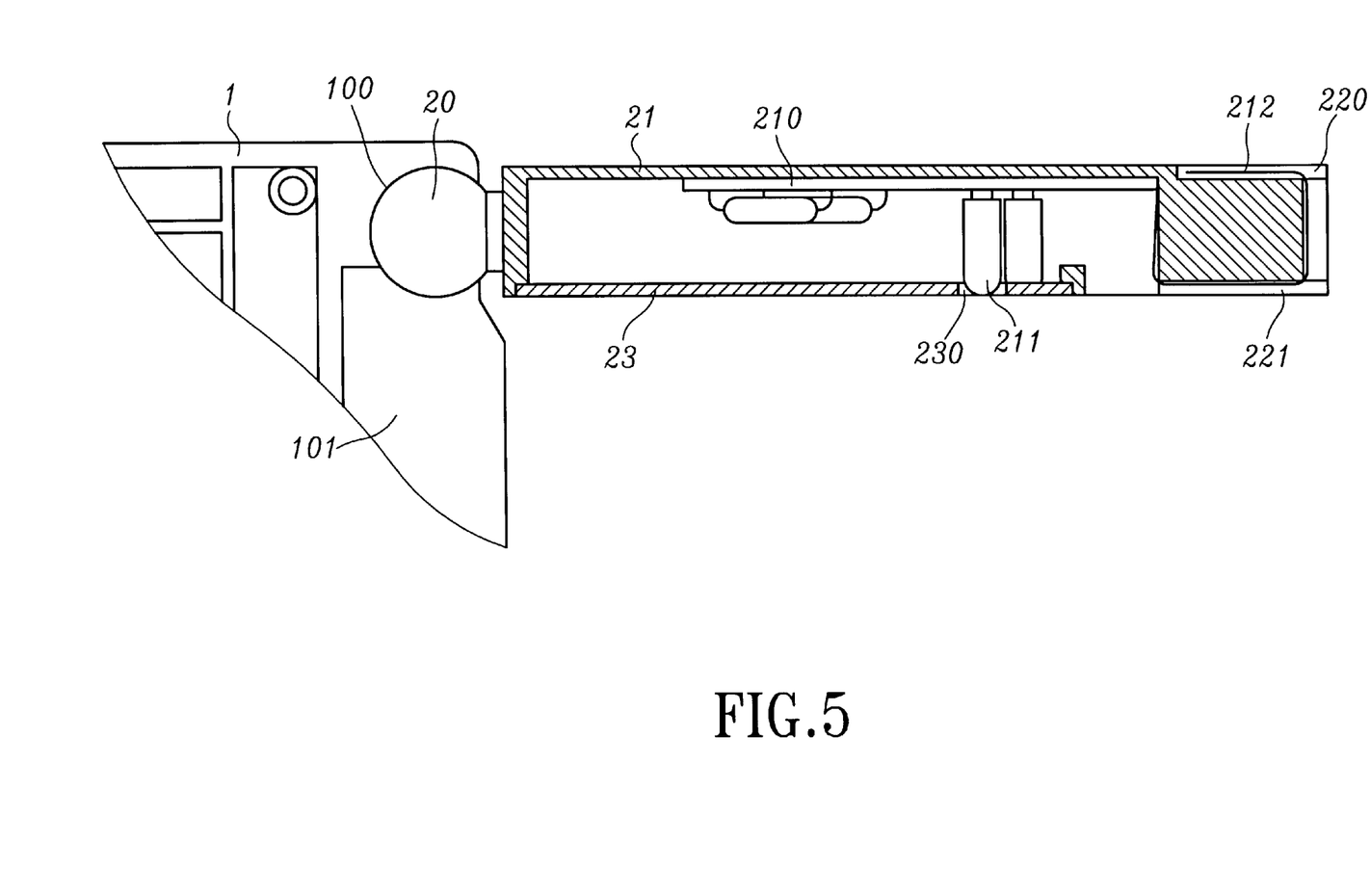
FIG. 5 is a cross-sectional view of the detector of FIG. 2 and part of the cable rewinding device showing the connection therebetween.

As shown in FIG. 1, the invention is implemented in a cable rewinding box 1 and a detector 2. The cable rewinding box 1 comprises a housing 10 having a receiving cavity 100 and receiving space 101 on one side of the box 1; a needle member 11; a predetermined length of communication cable 12 having two end plugs 120; a take-up reel 13 having a triangular member 130 provided on the base of the housing for winding the communication cable 12; a first helical spring 14 acting as retaining or loosening the cable 12 when actuated; a button 15 urged by a second spring 150 to be protruded from the surface of the housing 10 having a stopper member 151 urged against the corresponding triangular body 130, in which the stopper member 151 retains the cable 12 after a predetermined length of cable 12 is pulled out of the box 1, while the cable 12 is free to pull when the button 15 is pressed down, thereby releasing the stopper member 151 from the triangular body 130; and a pair of serially connected conversion connectors 16 provided on the other side for receiving a pair of communication plugs (not shown).

Note that the cable rewinding box 1 is a well known device as such a detailed description is omitted herein for not obscuring the invention.

In FIGS. 2–5, The detector 2 comprises a ball member 20, a body 21, a head portion 22 extended outwardly from a side of the body 21, and a side cover 23. The ball member 20 and the remaining components of the detector 2 (i.e., the ball member 20 not included) may are received in or pulled from the receiving cavity 100 and the receiving space 101 respectively due to the ball member 20 is in a universal joint relationship to the receiving cavity 100.

The detector 2 is to connect to a terminal with 4-pin configuration as an exemplary example. It is also possible to connect to a terminal with 6-pin or 8-pin configuration. A detecting circuit consisting of a circuit board 210, a number of LEDs 211, and a pair of cords 212 are provided in the body 21. Note that other sources of light are possible as long as they are easily recognized and implemented. The body 21 is covered by the side cover 23 having a number of holes 230 each corresponding to a LED 211. The head portion 22 comprises a pair of first spaced grooves 220 on one side and a pair of second spaced grooves 221 on the opposite side. The distance between two first grooves 220 is longer than that between two second grooves 221. Each cord 212 is provided between a first groove 220 and a corresponding second groove 221.

Figure 6:
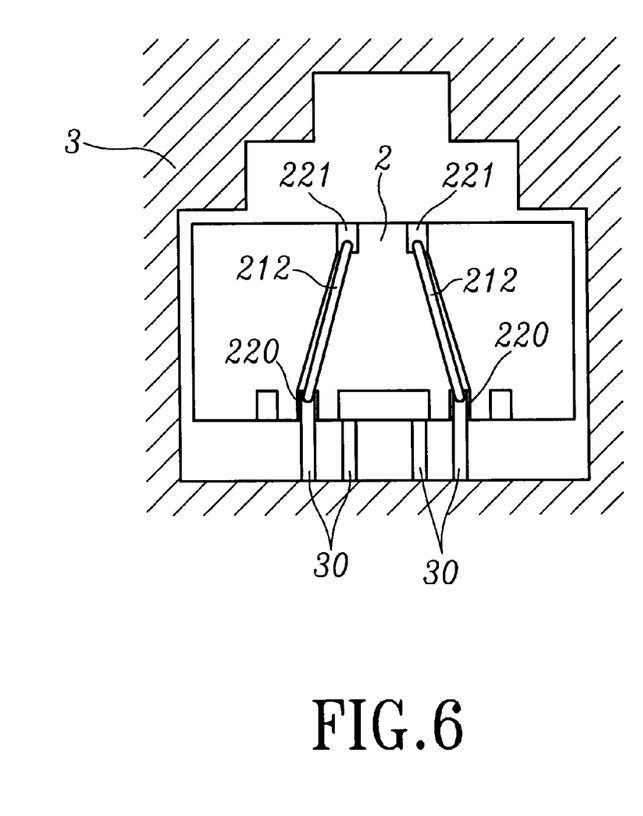
FIG. 6 is a cross-sectional view showing a configuration for detecting the electrical status between two terminals on the exterior of the jack.
Figure 7:
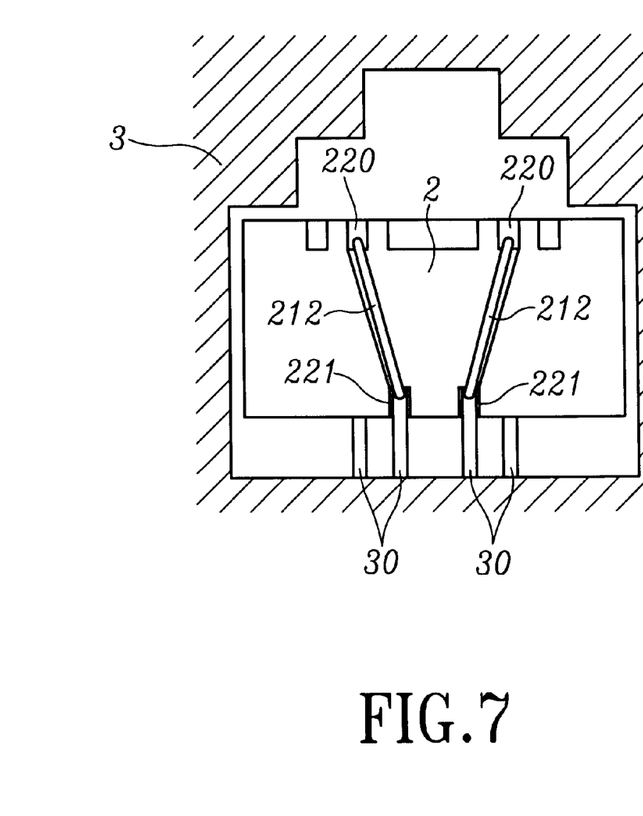
FIG. 7 is a cross-sectional view showing a configuration for detecting the electrical status between two terminals on the interior of the jack.

In operation as shown in FIGS. 6–7, plug the head portion 22 into a jack 3 haing a corresponding configuration. For the 4-pin configured terminal 30 of the jack 3, as stated above, it is designed to make the distance between two first grooves 220 longer than that between two second grooves 221. As such, it is necessary to turn the detector 2 based on the electrical polarities of the terminals 30 prior to plugging. It is seen that the cords 212 on the wider first grooves 220 are attached to the externally disposed terminals 30 of the plug 3 for detecting the electrical status therebetween. Alternatively, turn the detector 2 at an angle of 180° for attaching the cords 212 on the narrower second grooves 221 to the internally disposed terminals 30 of the plug 3 for detecting the electrical status therebetween.

Figure 8:
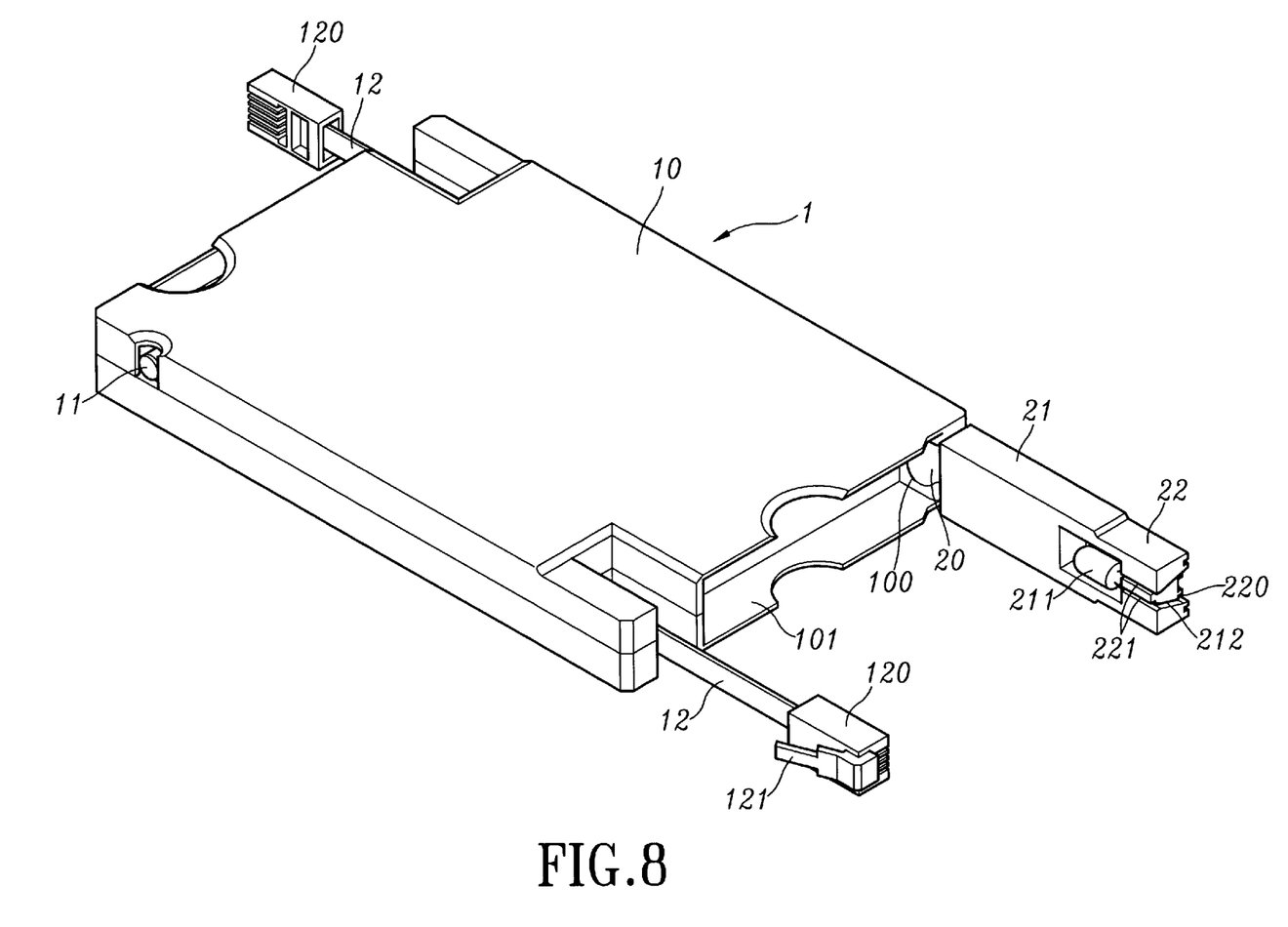
FIG. 8 is a perspective view of the cable rewinding device having a detector of a second embodiment of the present invention.
Figure 9:
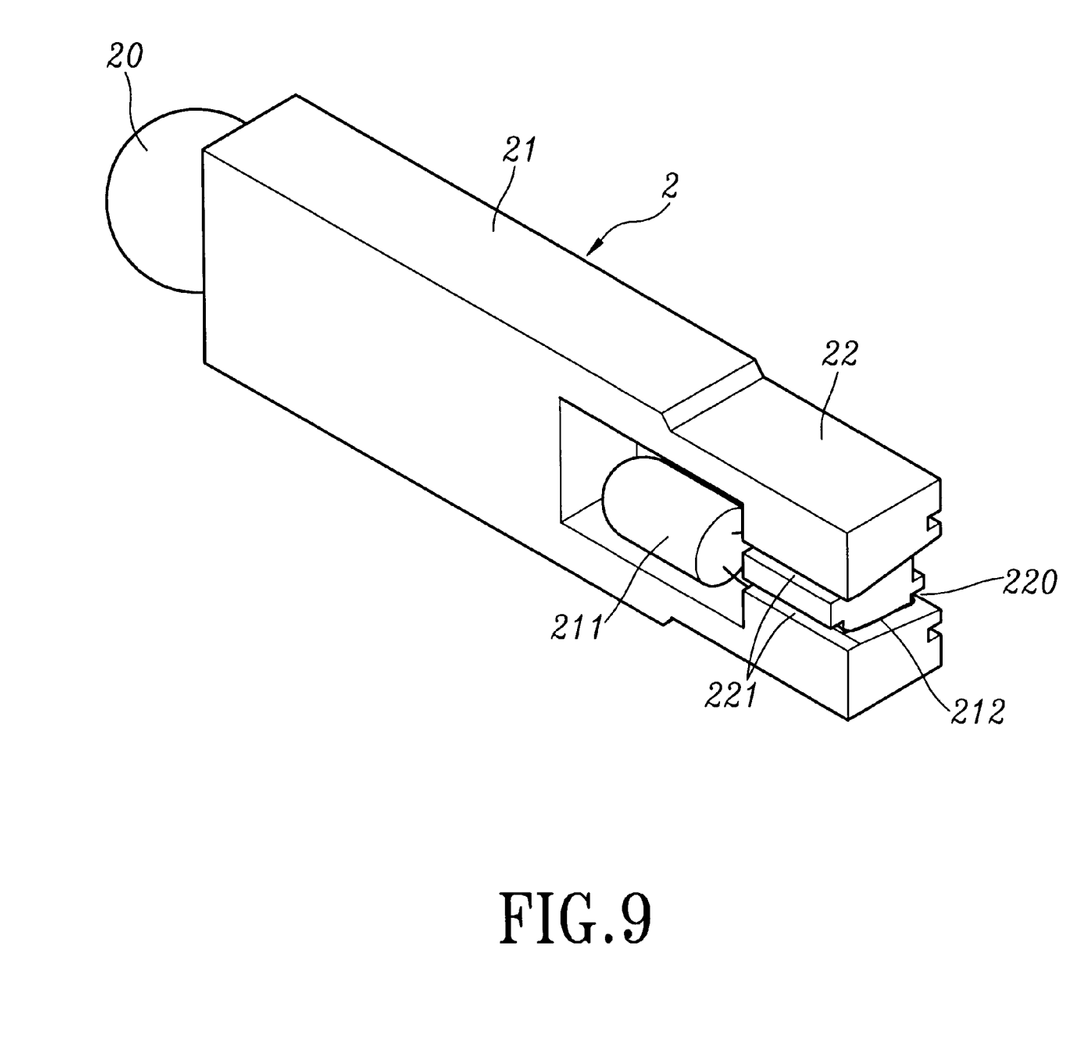
FIG. 9 is perspective view of the detector of FIG. 8.
Figure 10:
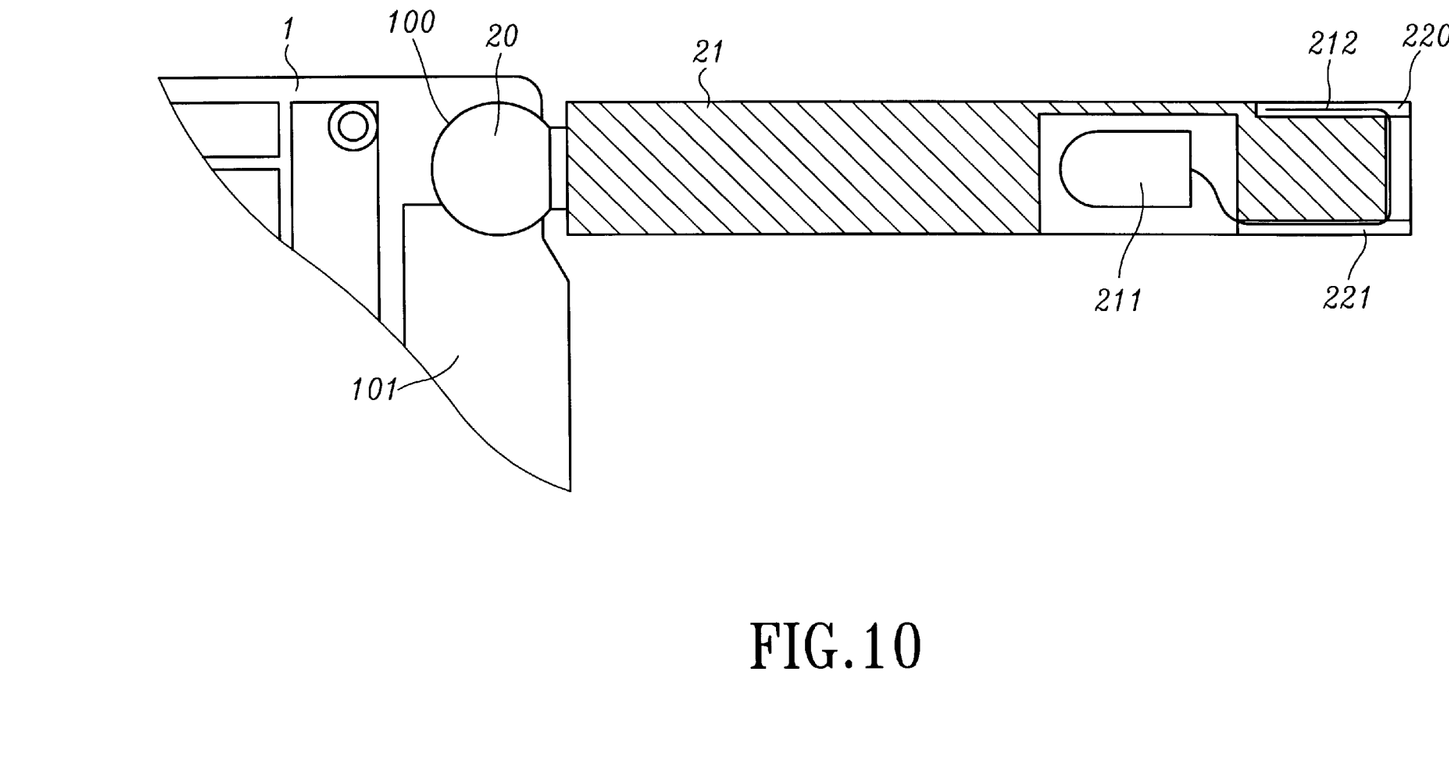
FIG. 10 is a cross-sectional view of the detector of FIG. 8 and part of the cable rewinding device showing the connection therebetween.

The number and colors of LEDs 211 may vary according to the implemented detecting circuitry, i.e., the detecting circuit having a single LED is possible as shown in the embodiment of FIGS. 8–10. As such, for example, a lighted LED may represent the communication cable is normal, while a dimmed LED may represent the communication cable is open, thereby enabling a repair in time if such occurs. Alternatively, two LEDs having different colors are implemented in which one LED may represent whether the communication cable is normal or open, while the other LED may represent whether there is an error in the connection of communication cable by lighting or not, thereby enabling a repair or a correction in time. It is also possible to have a three different color LEDs configuration, in which the first LED may represent the communication cable is normal or open, the second LED may represent whether there is an error in the connection of communication cable by lighting or not, and the third LED may represent whether there is an over current in the communication cable by lighting or not, thereby enabling a repair in time and further avoiding damage to the electrical equipment.

Note that the detector 2 is oriented when engaging with the jack 3 for detecting the communication cable. Further, the detector 2 is not interfered with the cable rewinding box 1 during operation. As stated above, the ball member 20 is in a universal joint relationship to the receiving cavity 100 when engaged. With such configuration, the cable rewinding box 1 can be turned to a position not interfering with the operation of the detector 2 and the jack 3 when engaged.

It is found that use may not see LEDs 211 in operation due to different viewpoints, such as on the back of LEDs 211. Thus, it is preferred to implement at (east one transparent circumferential member (not shown) on the detector 2 so as to let a user see clearly the color of the LEDs 211 and/or which LED 211 is on in any one of viewpoints. For example, the detector 2 is transparent, or only the head portion 22 or the body 21 is transparent so as to amplify the color of the LEDs 211 and/or a lighted LED 211 for projecting on the transparent circumferential member. As a result, a user can see clearly the color of the LEDs 211 and/or which LED 211 is on with respect to any one of turning angles of the detector 2.

Figure 11:
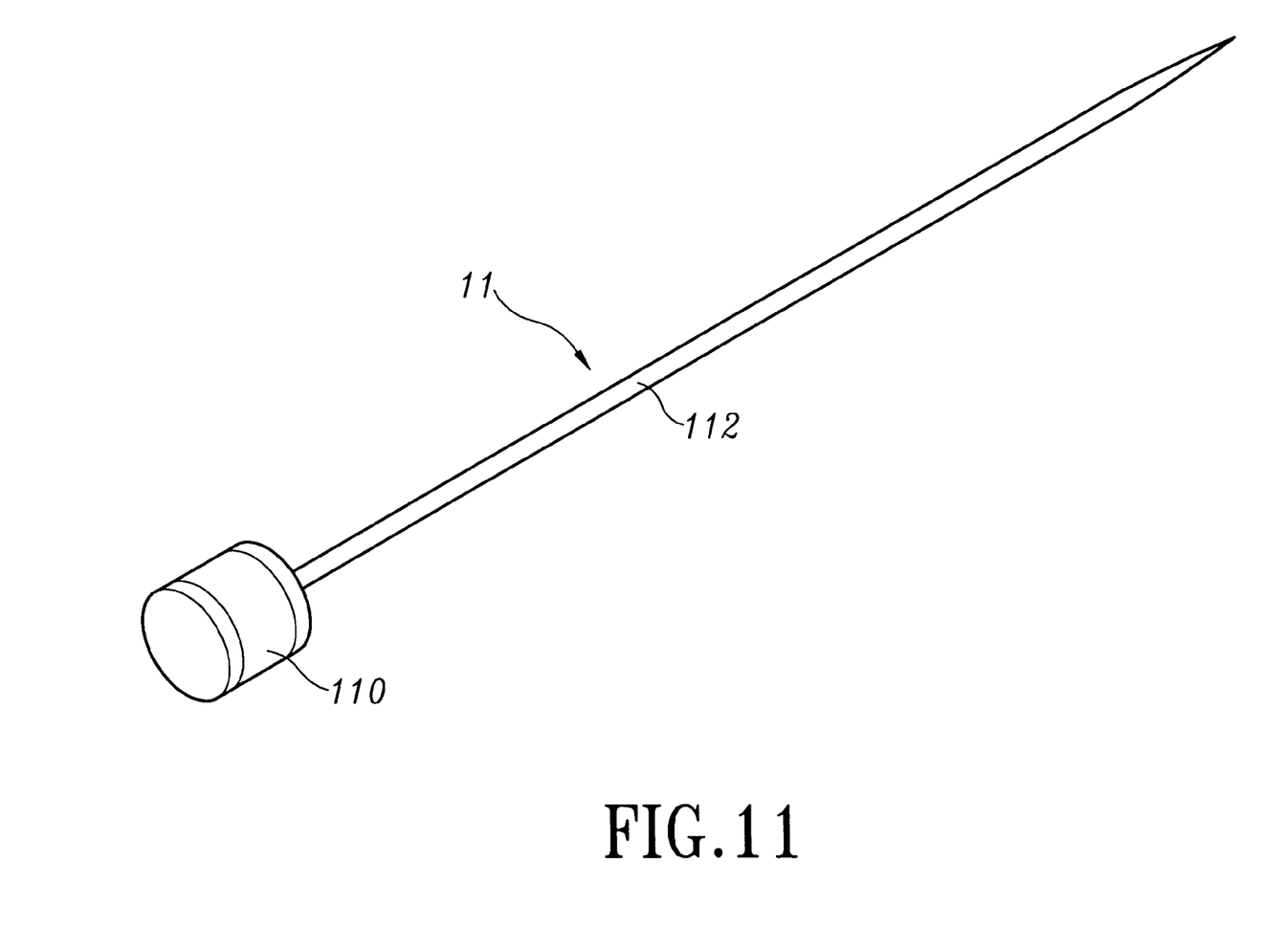
FIG. 11 is a perspective view of a needle member.

Referring to FIGS. 1, 8, and 11, a flexible tab 121 is provided on the plug 120. The flexible tab 121 acts as pushing the plug 120 for securing it within the jack 3, or alternatively facilitating to pull the plug 120 out of the jack 3. However, it is possible to break the tab 121 after a period of time in use, accidentally, or inappropriate operation. To the worse, the broken tab 121 may be stuck in the jack 3, thus unabling to pull it out.

To overcome such problem, as stated above, the invention provides the needle member 11 on one side of the cable rewinding box 1. The needle member 11 comprises a head 110 and a slender rod 112 with a pointed end. The needle member 11 is inserted through the hole of a raised member 111 located besides the conversion connectors 16 in a stored position. When a broke tab 121 occurs, we may use a hand to hold the head 110, and then insert the rod 112 into the jack 3 for pulling broken pieces as well as the plug 120 out of the jack 3.

Note that various configurations are possible for the cable rewinding box 1. Further, the detector 2 and needle member 11 are also possible to be implemented in any type of cable rewinding boxes.

While the invention herein disclosed has been described by means of specific embodiments, numerous modifications and variations could be made thereto by those skilled in the art without departing from the scope of the invention set forth in the claims.

What is claimed is:

1. A cable rewinding device comprising:
   a rewinding means having a receiving space and a receiving cavity; and
   a detector provided on a first side of the rewinding means including a ball member, a body including a detecting circuit having a circuit board, a plurality of lights, and a plurality of cords, a head portion extended outwardly from a first side of the body having a plurality of first spaced grooves and a plurality of second spaced grooves, and a side cover;
   wherein the cords are in an electrical communication with the first and the second spaced grooves such that an electrical status of a cable having a plug is obtained through the lights when the plug is inserted into the first and the second spaced grooves.

2. The cable rewinding device of claim 1, wherein a distance between two of the first spaced grooves is longer than that between two of the second spaced grooves.

3. The cable rewinding device of claim 1, wherein the lights are light-emitting diodes ("LEDs").

4. The cable rewinding device of claim 3, wherein one of the LEDs represents whether the cable is open or not.

5. The cable rewinding device of claim 3, wherein one of the LEDs represents whether there is an error in a connection of the cable.

6. The cable rewinding device of claim 3, wherein one of the LEDs represents whether there is an over current in the cable.

7. The cable rewinding device of claim 1, wherein the ball member is received in the receiving cavity in a universal joint configuration.

8. The cable rewinding device of claim 1, wherein the body and the head portion is received in the receiving space in a stored position.

9. The cable rewinding device of claim 1, further comprising a needle member provided on a second side of the rewinding means.

10. The cable rewinding device of claim 9, wherein the second side of the rewinding means is opposite to the first side of the rewinding means.

11. The cable rewinding device of claim 3, further comprising a plurality of holes provided on the side cover each disposed correspondingly to one of LEDs.

12. The cable rewinding device of claim 1, wherein the detector is made of a transparent material.

13. The cable rewinding device of claim 1, further comprising a pair of serially connected conversion connectors provided on the second side of the rewinding means for receiving a pair of communication plugs.

* * * * *